US007173958B2

(12) United States Patent
Ho et al.

(10) Patent No.: US 7,173,958 B2
(45) Date of Patent: Feb. 6, 2007

(54) METHOD FOR CELL SEARCH UNDER EFFECT OF HIGH CLOCK OFFSET

(75) Inventors: Jan-Shin Ho, Yi Lan (TW); Wern-Ho Sheen, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 847 days.

(21) Appl. No.: 10/318,450

(22) Filed: Dec. 13, 2002

(65) Prior Publication Data

US 2003/0193922 A1    Oct. 16, 2003

(30) Foreign Application Priority Data

Apr. 16, 2002    (TW) ................ 91108028 A

(51) Int. Cl.
*H04B 1/00*    (2006.01)
(52) U.S. Cl. ....................... 375/145; 375/149
(58) Field of Classification Search ........... 375/145, 375/137, 143, 149, 152
See application file for complete search history.

(56) References Cited

U.S. PATENT DOCUMENTS

| 6,038,250 | A  | * | 3/2000  | Shou et al. ........... 375/143 |
| 6,728,203 | B2 | * | 4/2004  | Wang ................. 370/210 |
| 6,831,929 | B1 | * | 12/2004 | Sriram et al. ......... 370/515 |
| 6,965,586 | B1 | * | 11/2005 | Maruyama ............ 370/335 |

OTHER PUBLICATIONS

Shenn, "Cell search for 3GPP W-CDMA/FDD with chip clock shift and non-ideal sampling" Vehicular Technology Conference, 2001. VTC 2001 Fall, IEEE VTS 54th vol. 4, Oct. 7-11, 2001, pp. 2369-2373 vol. 4.*
Wang, "Cell search algorithms and optimization in W-CDMA". Vehicular Technology Conference Proceedings, 2000, VTC 2000-Spring Tokyo. 2000 IEEE 51st vol. 1, May 15-18, 2000 pp. 81-86 vol. 1.*
Wang, "Cell search in W-CDMA", IEEE Journal on Selected Areas in Communications, vol. 18, Issue 8, Aug. 2000 pp. 1470-1482.*

* cited by examiner

*Primary Examiner*—Temesghen Ghebretinsae
*Assistant Examiner*—Juan Alberto Torres
(74) *Attorney, Agent, or Firm*—Thomas, Kayden, Horstemeyer & Risley

(57) ABSTRACT

The present invention discloses a cell search method for a CDMA system, using a three-stage cell search. The method comprises matching an incoming signal from the base station, wherein the frequency of the incoming signal having an uncertain range; over-sampling the incoming signal N times against a chip rate and outputting the N over-samples; down-sampling the incoming signal and outputting N over-samples to a first stage, a second stage and a third stage. The first stage further comprises selecting a first group of slot boundaries as a first group of candidates after pre-selection, and the first group of candidates transmitting to a deciding selection stage of the first stage and the second stage to be continuously processed. The cell search method of the present invention can be used to reduce the effect of clock offset on the performance of cell search and to accomplish fast cell search.

18 Claims, 12 Drawing Sheets

(a) Observations on the Optimum Chip Timing (b) Observations of One Chip Neighbor to the Optimum Chip Timing Table I:Clock Shift with Different Frequency Offset in a 30 ms Trial

| Frequency Offset (kHz) | Clock Shift with Time ($\tilde{T}c$) | | |
|---|---|---|---|
| | 10 ms | 20 ms | 30 ms |
| 0 | 0 | 0 | 0 |
| 6 | 0.1152 | 0.2304 | 0.3456 |
| 8 | 0.1536 | 0.3072 | 0.4608 |
| 12 | 0.2304 | 0.4608 | 0.6912 |
| 24 | 0.4608 | 0.9216 | 1.3824 |

Table. 1 (Prior art)

METHOD FOR CELL SEARCH UNDER EFFECT OF HIGH CLOCK OFFSET

BACKGROUND OF THE PRESENT INVENTION

1. Field of the Present Invention

The present invention relates to a cell search method suitable for a code division multiple access (CDMA) system. More particularly, the present invention provides a cell search method suitable for a wideband CDMA (W-CDMA) system that can reduce the clock offset effects in the system.

2. Description of the Related Art

The demand for efficient transmissions of large amounts of data in ground mobile communication systems has facilitated the application of direct sequence spread spectrum (DSSS) transmissions. Code division multiple access (CDMA) technology cellular systems use DSSS. A DSSS system's channel capacity is substantially larger than the channel capaciw of a frequency-hopping spread spectrum system. Conventionally, due to frequency reuse, the bandwidth efficiency of a CDMA system is greater than that of other multiple access systems such as a frequency division multiple access (FMA) system or a time division multiple access (TDMA) system.

Furthermore, cell planning is easily achieved in the CDMA system. Therefore, it is foreseen that a CDMA cellular system will undergo substantial developments in the future. W-CDMA/FDD (frequency division duplex) systems, as discussed in the Third Generation Partnership Project (3GPP), has been already adopted as one of the standards for the International Mobile Telecommunication 2000 (IMT-200) third generation system.

In the CDMA cellular system the mobile station or user equipment has to initially find and synchronize itself to a base station in a process commonly called "cell search". Fast cell search is reduces the on-switch delay of the mobile station (initial cell search), increases the standby time (idle mode cell search), and maintains connection quality during the handover or handoff operation (active mode cell search).

The U.S. Pat. No. 6,038,250, issued to Shou et al. and entitled "Initial synchronization method and receiver for DS-CDMA inter base station asynchronous cellular system", the disclosure of which is incorporated by reference herein, proposes the implementation of an initial synchronization method in a high speed cell search and the utilization of a specific receiver in a DS-CDMA inter base station asynchronous cellular system. According to Shou et al., a base band received signal is delivered to a matched filter and is correlated with a spread code that is produced via a spread code generator. A signal electric power calculator determines the electric power of the output signal of the matched filter, and consequently delivers the result respectively to a long code synchronization timing determiner, to a threshold value calculator, and to a long code identifier. During the initial cell search, the spread code generator outputs a short code that is common to the control channel of each of the base stations. After the long code synchronization timing has been determined, each chip, which forms a portion of synthesized spread code sequence of N chips, is successively handed over and outputted.

In the U.S. Pat. No. 6,185,244, issued to Nystrom and entitled "Cell searching in a CDMA communication system", the disclosure of which is incorporated herein by reference, a special coding scheme is proposed to more effectively acquire a long code and a frame timing during the cell search. As stated by Nystrom:

"A code set of M Q-ary code words length, including symbols from a set of Q short codes, is defined with certain properties. The primary property that has to be satisfied is that no cyclic shift of a code word yields a valid code word. The other properties to be satisfied are that there is one-to-one mapping between a long code message and a valid code word, and a decoder should be able to find both the random shift (thereby implicitly finding the frame timing) and the transmitted code word (i.e. its associated long code indication message) in the presence of interference and noise, with some degree of accuracy and reasonable complexity."

In the U.S. Pat. No. 6,289,007, issued to Kim et al. and entitled "Method for acquiring a cell site station in asynchronous CDMA cellular communication systems", the disclosure of which is incorporated herein by reference, a group code and a cell code, used as pilot codes, are multiplexed and used as a pilot code for discriminating a base station in an asynchronous cellular CDMA communication system. The pilot codes are used in different base stations of the asynchronous cell CDMA system. Multiplexing the pilot codes reduces interference. As disclosed by Kim et al., the proposed method acquires a cell site station in an asynchronous CDMA mobile communication system that comprises a base station controller, a plurality of mobile stations and base stations. The base stations are discriminated using different sequences. The method includes: (a) assigning a group code of the cell as a pilot code of an inphase channel of the base station; (b) assigning a cell code of the cell as a pilot code of a quadrature channel of the base station; and (c) multiplexing the pilot codes of the inphase channel and the quadrature channel, and generating an inphase/quadrature pilot code.

Referring to FIG. 1, a schematic view illustrates the frame structure of a 3GPP wide-band CDMA system. In a 3GPP wide-band CDMA system, the cell search is typically performed through three stages that include two specifically designed synchronization channels (SCH) and one common pilot channel (CPICH). In a first stage 110, a primary synchronization channel (PSCH) 111 is used for slot synchronization. The PSCH 111 includes a primary synchronization code (PSC) referred to as $ac_p$, wherein "a" ($=\pm 1$) depends on the existence of a diversity transmission at the base station. In the second stage 120, the frame/code group is identified by means .of a secondary synchronization channel (SSCH) 121. The secondary synchronization channel 121 includes a secondary synchronization code (SSC) referred to as $ac_s$, wherein the coefficient "a" is equal to that of the primary synchronization code. In the third stage 130, the downlink scrambling code is determined by means of a common pilot channel 131. As illustrated, a 10 ms-long frame includes 15 slots. Because the system has a chip rate of 3.84 Mchips/sec, each frame therefore includes 38400 chips, and each slot includes 2560 chips. Furthermore, the primary synchronization channel and the secondary synchronization channel are 256 chips-long and only transmit at the beginning of the slot boundary.

The cell search conventionally implemented in the 3GPP wide-band CDMA/FDD system can be usually divided into two general types: the serial cell search method and the pipelined cell search. Before a new cell search trial is started, the serial cell search needs to undergo three successive synchronization stages. These three synchronization stages include: (1) slot synchronization; (2) frame synchronization/code group identification; and (3) scrambling code identification.

Referring to FIG. 2, a schematic diagram illustrates a serial search method used in a 3GPP W-CDMA system in the prior art, in which the processing time of each stage being 10 ms. The completion of a sequence of the three stages is usually called a trial, while a successful cell search comes after the first successful trial. In a serial cell search, the trials do not overlap one another. In other words, only one single stage is conducted at a time, i.e. only one block 211 (or block 212 or block 213) is conducted at a time (each block represents a stage of one trial). Less power is therefore consumed, but the cell search time is negatively longer.

Referring to FIG 3, a simplified schematic diagram illustrates the pipelined cell search method known in the prior art, in which the three stages of different trials are concurrently conducted (i.e. three-stage cell search are operated in parallel). In other words, the different trials overlap one another. For example, the blocks 311, 321, and 331 belong to the same trial. In the pipelined cell search method, more trials are allowed within a given time interval. Therefore, a faster cell search may be accomplished. However, this method consumes more power. For example, if each stage requires 10 ms, and the pipelined cell search is successful at the K-th trial, the cell search needs a cell search time of (K+2)×10 (ms). In contrast, a serial cell search would need K×30 (ms). Notice that compared to the serial cell search method, the implementation of the pipelined cell search method does not require additional hardware.

However, the implementation of the cell search methods of the prior art in a 3GPP W-CDMA/FDD system requires the assumption of two premises. First, the outputted sample from the chip-matched filter is ideal. Secondly, the chip clock of the transmitter is precisely known to the receiver (i.e. no clock offset occurs). In other words, the chip duration of the incoming signal is not subject to any frequency offset. Practically, the above assumptions are rarely met. Non-ideal sampling effects usually occur due to the uncertain propagation delay, and the frequency offset is most of the time caused by frequency instability of the crystal oscillator in the user equipment. The frequency offset in the digital receiver produces two effects: (1) a phase offset; and (2) a clock offset. Unfortunately, the clock offset generally is not considered in the prior art. This clock offset, caused by the frequency offset, however exists between the base station and the user equipment. As illustrated in Table.1, different conditions of frequency offset produce corresponding clock offset effects. For example, if a frequency offset of 12 kHz occurs, a frame of 30 ms is likely to include an offset of about 0.69 times the chip length, which is approximately a clock offset of 6 ppm. This would result in a signal difference and increase the cell search time.

FIG. 4(a) and FIG. 4(b) are schematic graphs illustrating the resulting signal level and inter-chip interference under the presence of the clock offset, caused by a frequency offset. As illustrated, due to the clock offset, the signal level is deteriorated and the inter-chip interference increases.

SUMMARY OF THE PRESENT INVENTION

The primary object of the present invention is to provide a fast cell search method for a CDMA system, particularly for the W-CDMA system, that reduces the performance degradation of cell search under the effect of high clock offset.

The second object of the present invention is to provide a multiple dwell scheme used for three-stage cell search, and especially for the first stage and the second stage to reduce the effect of high clock offset in the system.

In order to achieve the primary object, the present invention provides a cell search method for the CDMA system, using a three-stage cell search. The cell search method according to the present invention comprises matching an incoming signal having a uncertain range of carrier frequency from a base station; over-sampling the incoming signal at a chip rate thereby obtaining an over-sampled incoming signal; down-sampling the over-sampled incoming signal into a down-sampled incoming signal having a plurality of slot boundaries; and applying a trial to the down-sampled incoming signal.

One feature of the cell search method according to the present invention is that the trial comprises slot synchronizing the down-sampled incoming signal as a first stage; frame synchronizing and code group identifying the down-sampled incoming signal as a second stage; identifying a scrambling code of the down-sampled incoming signal as a third stage; testing the scrambling code against a threshold $\eta_0$ as a first verification; and wherein if the threshold $\eta_0$ is not exceeded, the trial fails and a trial restarts without a penalty time; otherwise testing the scrambling code of the first verification that has exceeded the threshold $\eta_0$ as a second verification; wherein if the scrambling code of the first verification is not exceeded the threshold $\eta_0$, a trial restarts with a penalty time.

Still another feature of the cell search method according to the present invention is that the first stage comprises pre-selecting a first group of slot boundaries as a first group of candidates; and deciding the selection of a second group of candidates from the first group of candidates; wherein the decision selecting comprising, and continuously checking the first group of candidates to differentiate preferred candidates, and the second stage comprises selecting a third group of candidates from the first group of candidates.

Still another feature of the cell search method according to the present invention is that the signals in each stage are randomly chosen from one of the over-sampled (N times over the chip rate) incoming signals. Different selection methods correspond to different scenarios. For example, one may randomly select the sample out of the N over-samples for each trial (RSPT), or frame by frame random sample (RSPF), or slot by slot random sample (RSPS). . . etc.

Still another feature of the cell search method according to the present invention is that the frequency uncertainty between the base-station and the user equipment is further divided into a plurality of cells such that each have a sub-carrier frequency.

Other objects, advantages, and novel features of the present invention will become more apparent from the following detailed description when taken in conjunction with the accompanying drawing.

Figure 1:
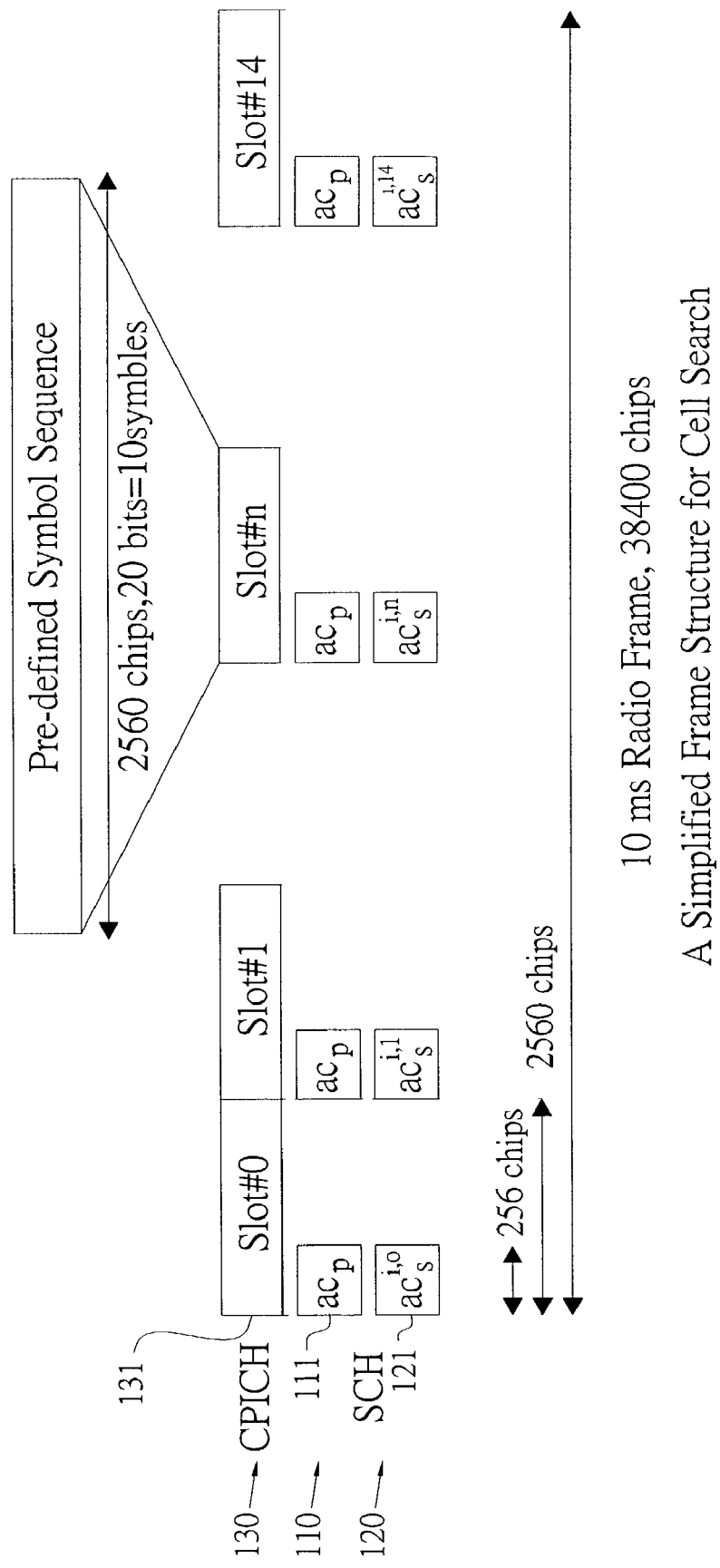
FIG. 1 a schematic view illustrating the frame structure of a 3GPP wide-band CDMA system.
Figure 2:
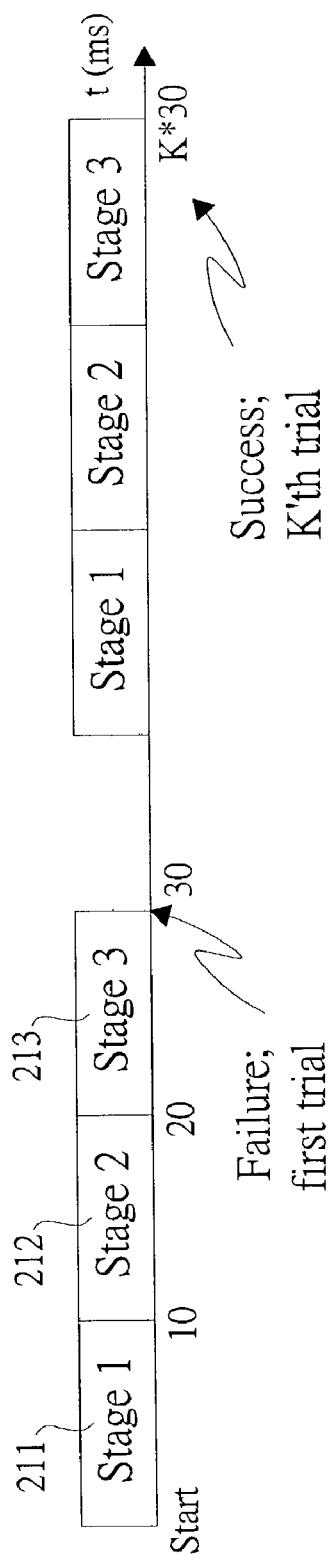
FIG. 2 is a schematic diagram illustrating a serial search method used in a 3GPP W-CDMA system in the prior art, in which the processing time of each stage being 10 ms.
Figure 3:
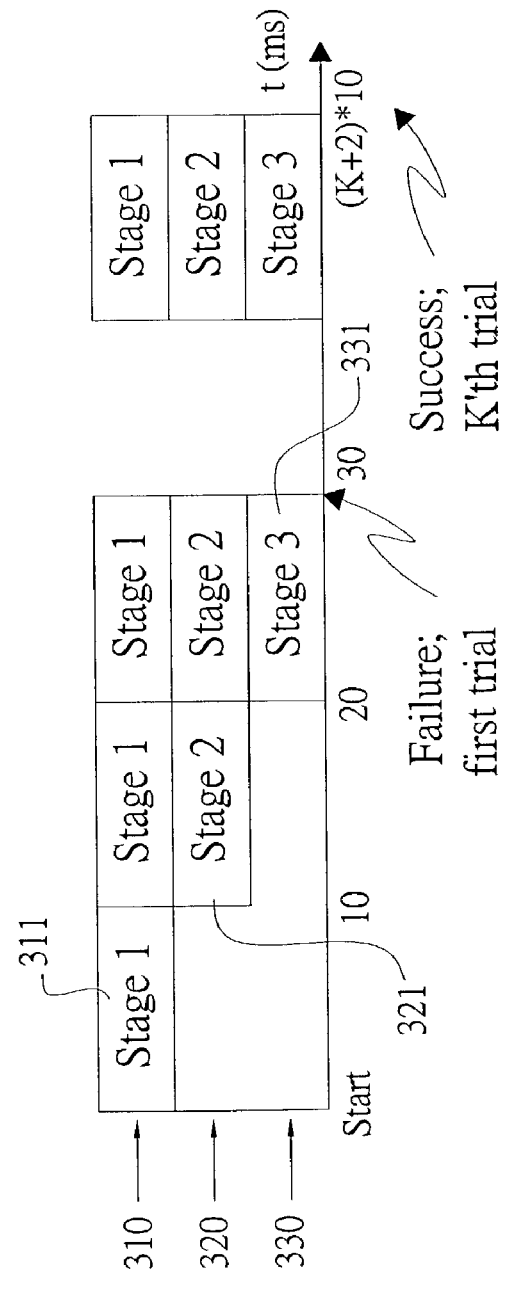
FIG. 3 is a simplified schematic diagram illustrating a pipelined cell search method in the prior art, in which the three stages of different trials are concurrently conducted (i.e. three-stage cell search are operated in parallel)
Figure 4A:
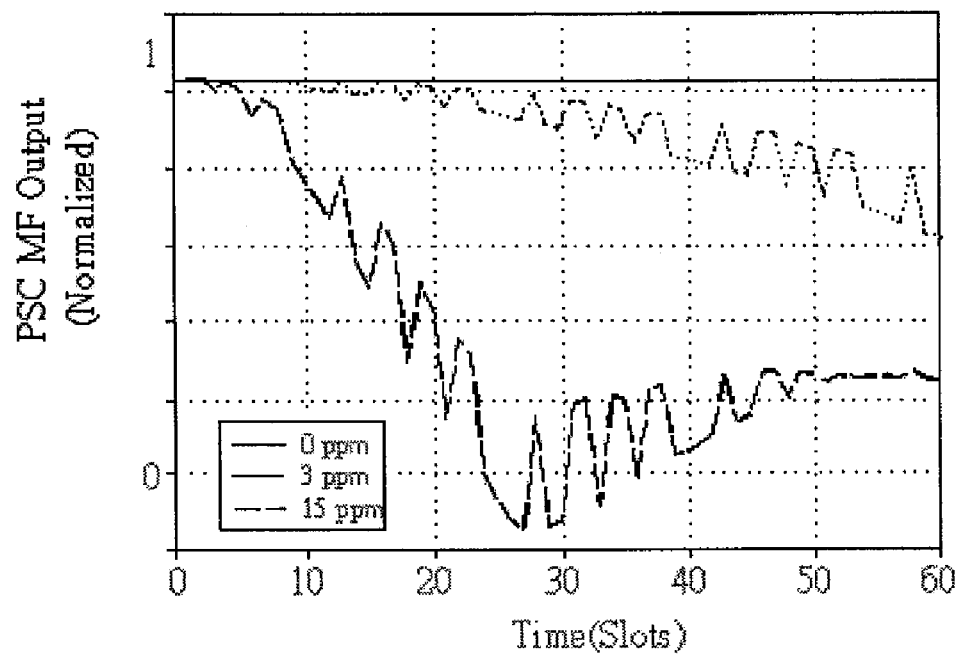
Figure 4B:
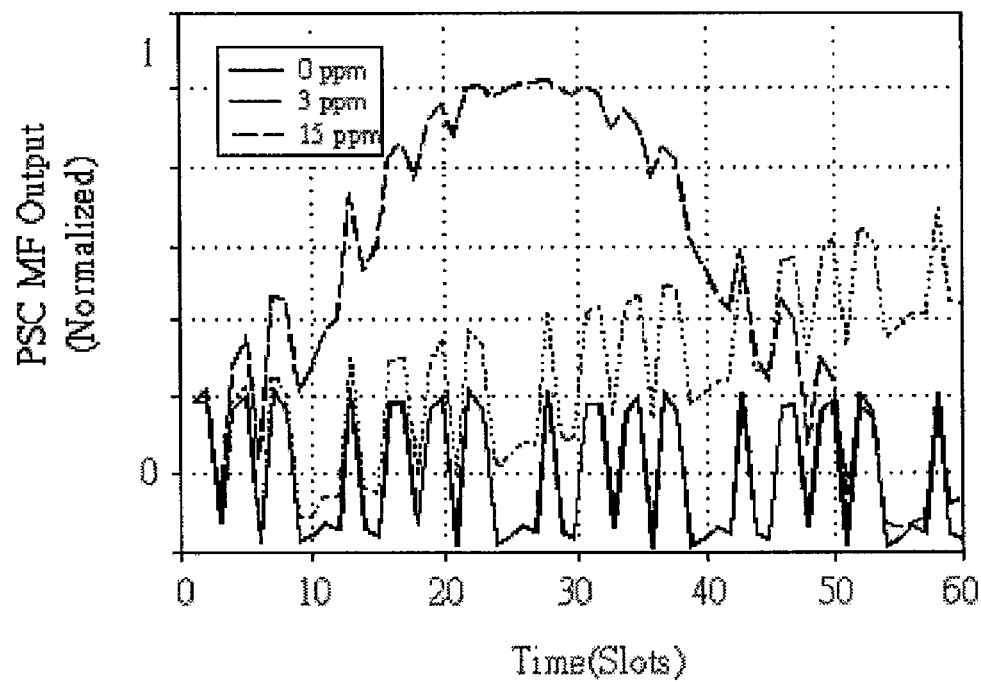
Figure 5:
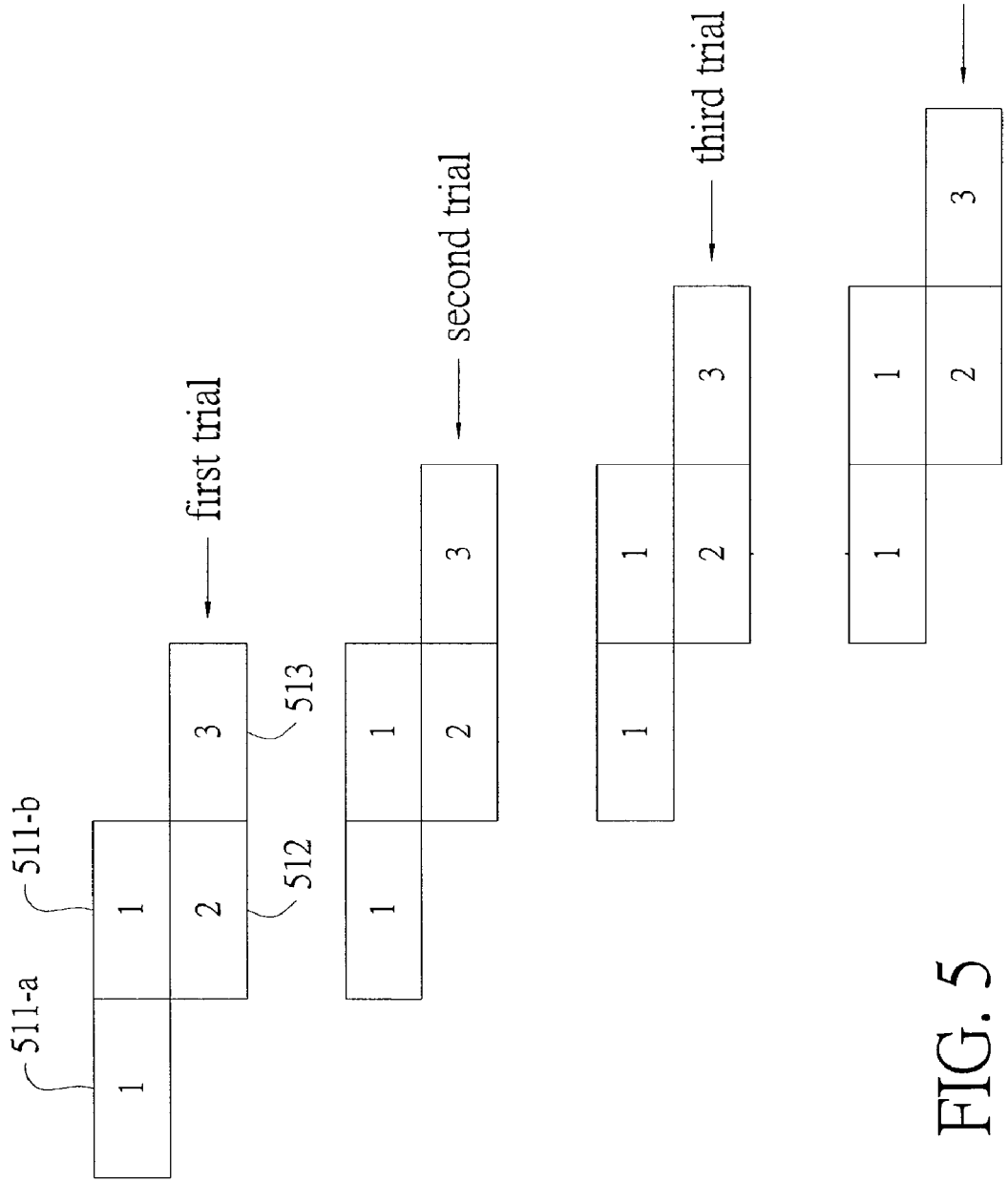
Figure 6:
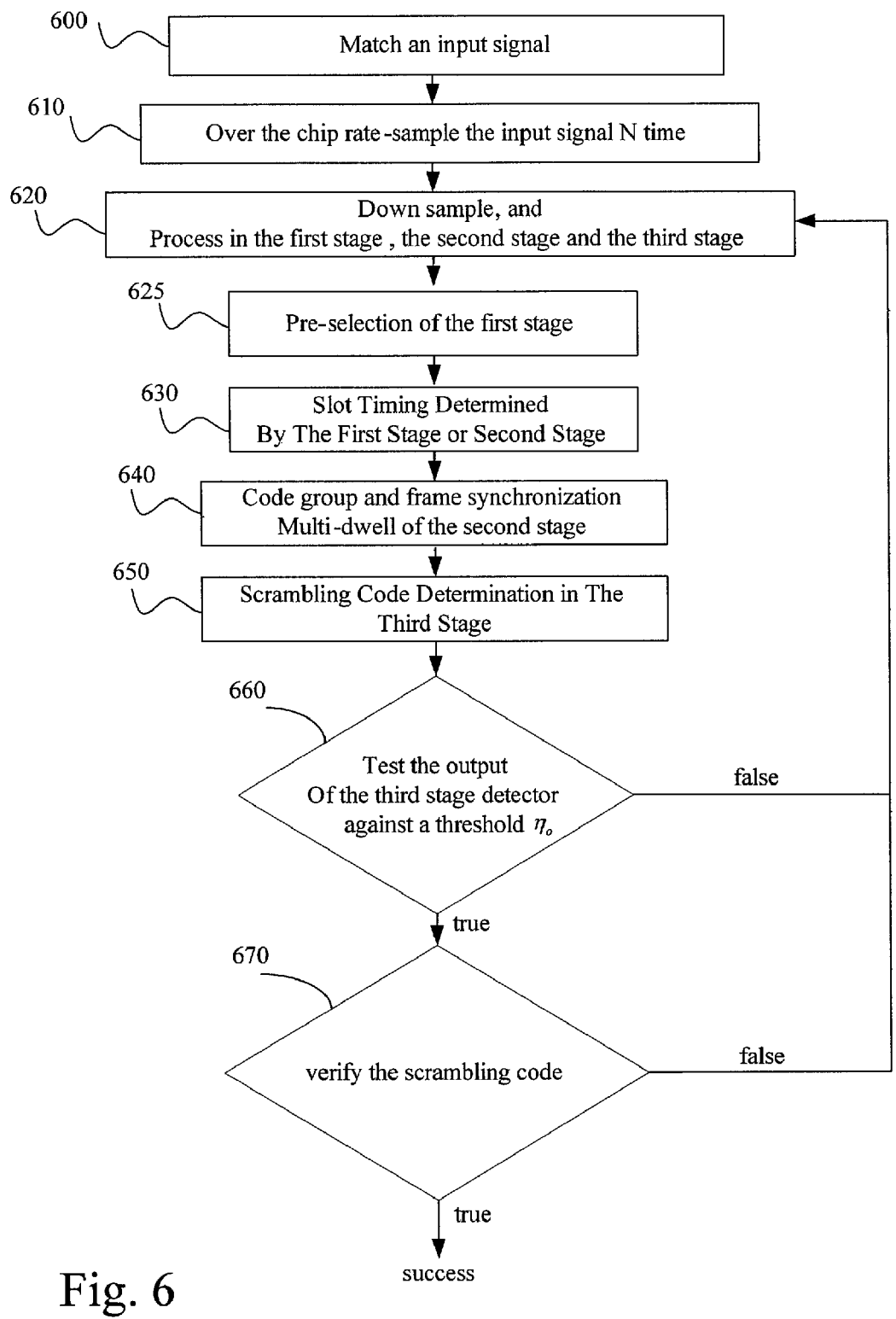
Figure 8:
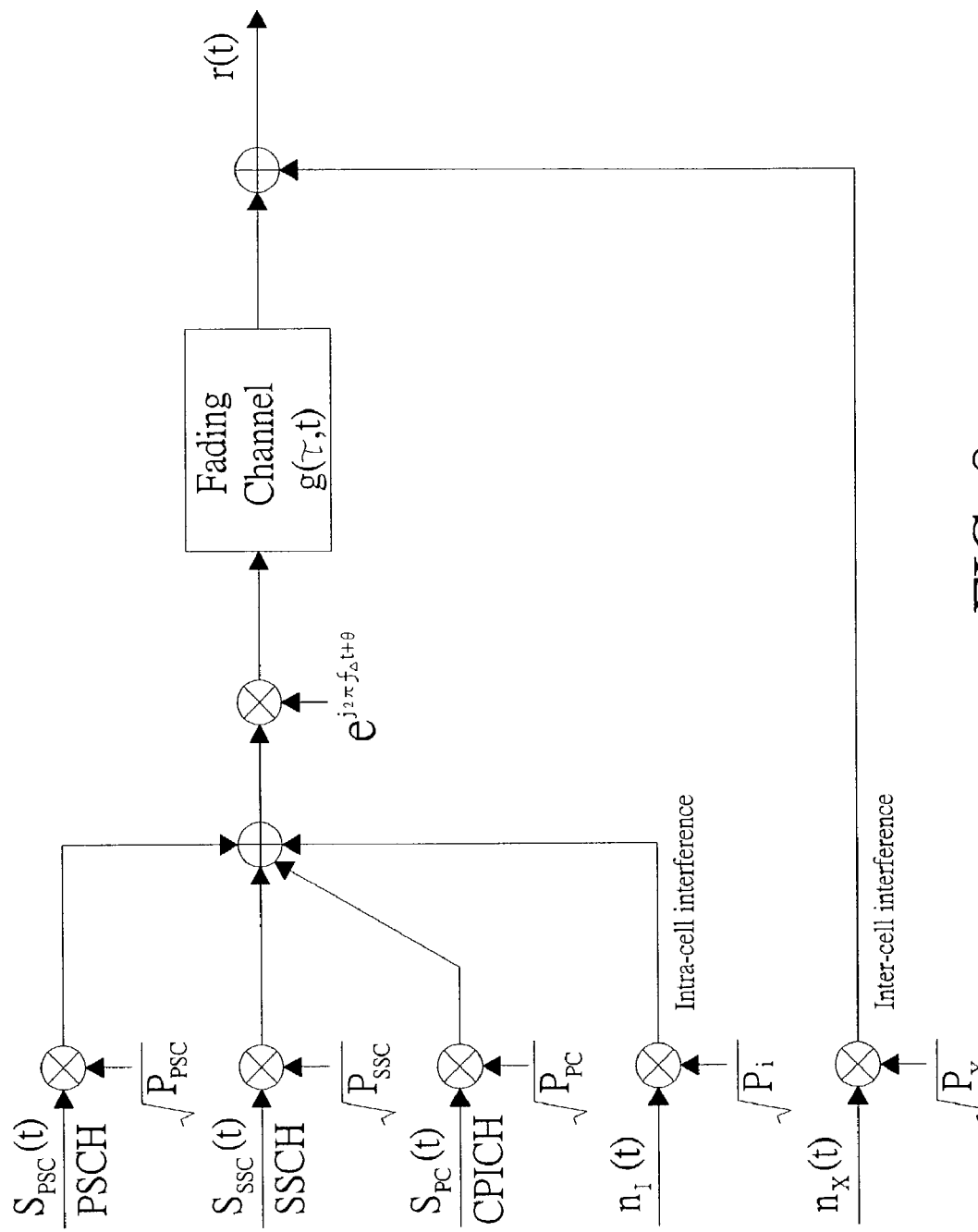
Figure 9:
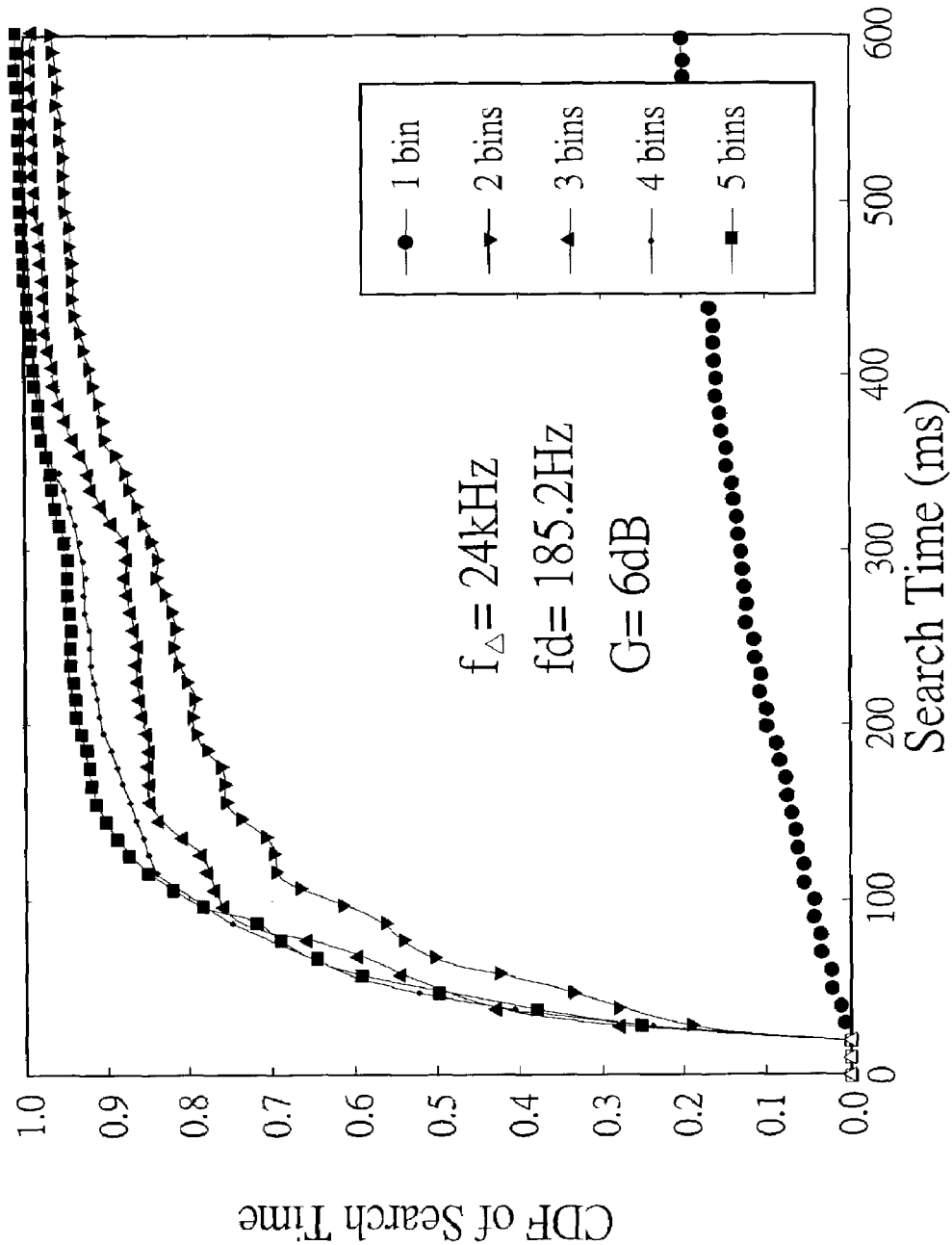
Figure 10:
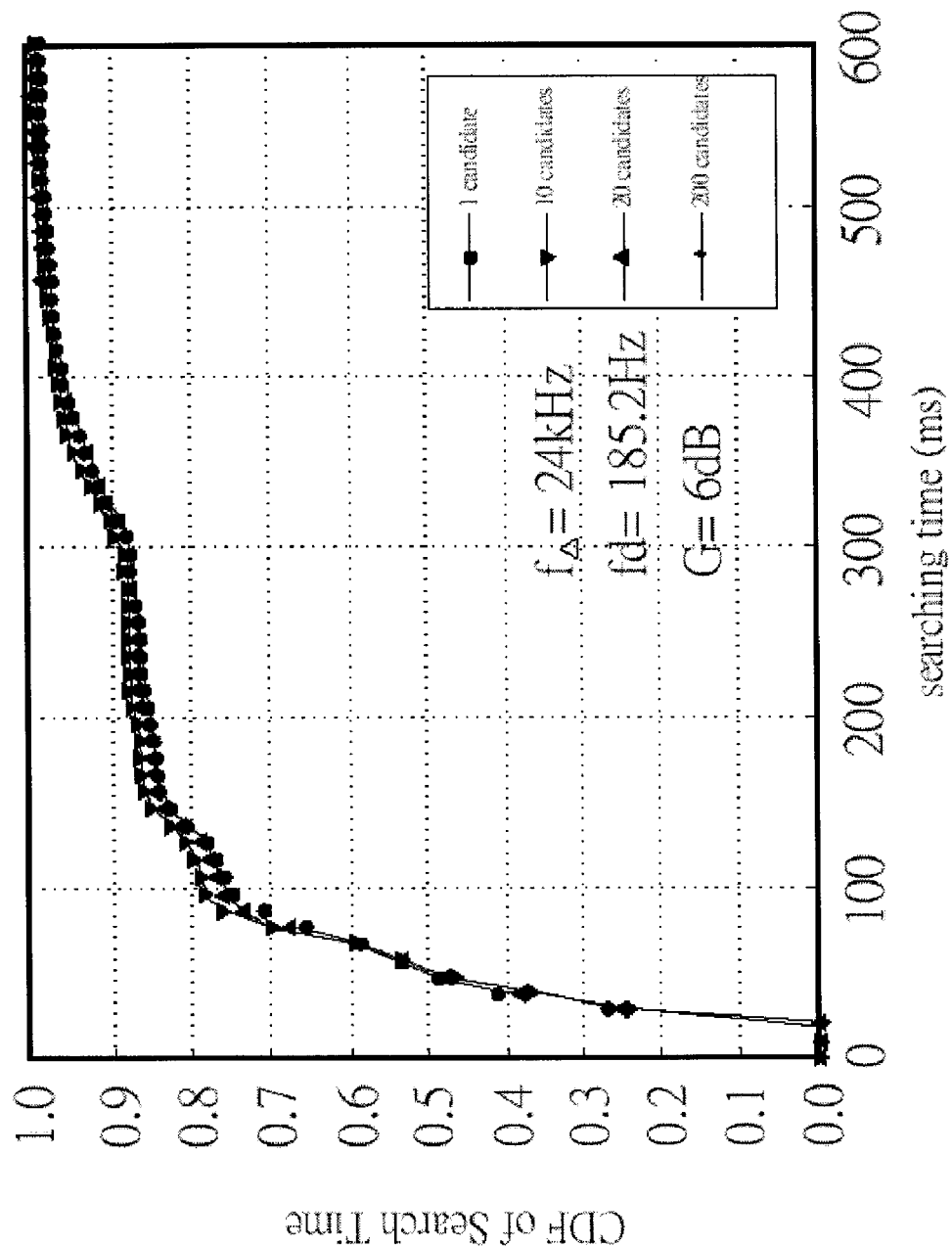
Figure 11:
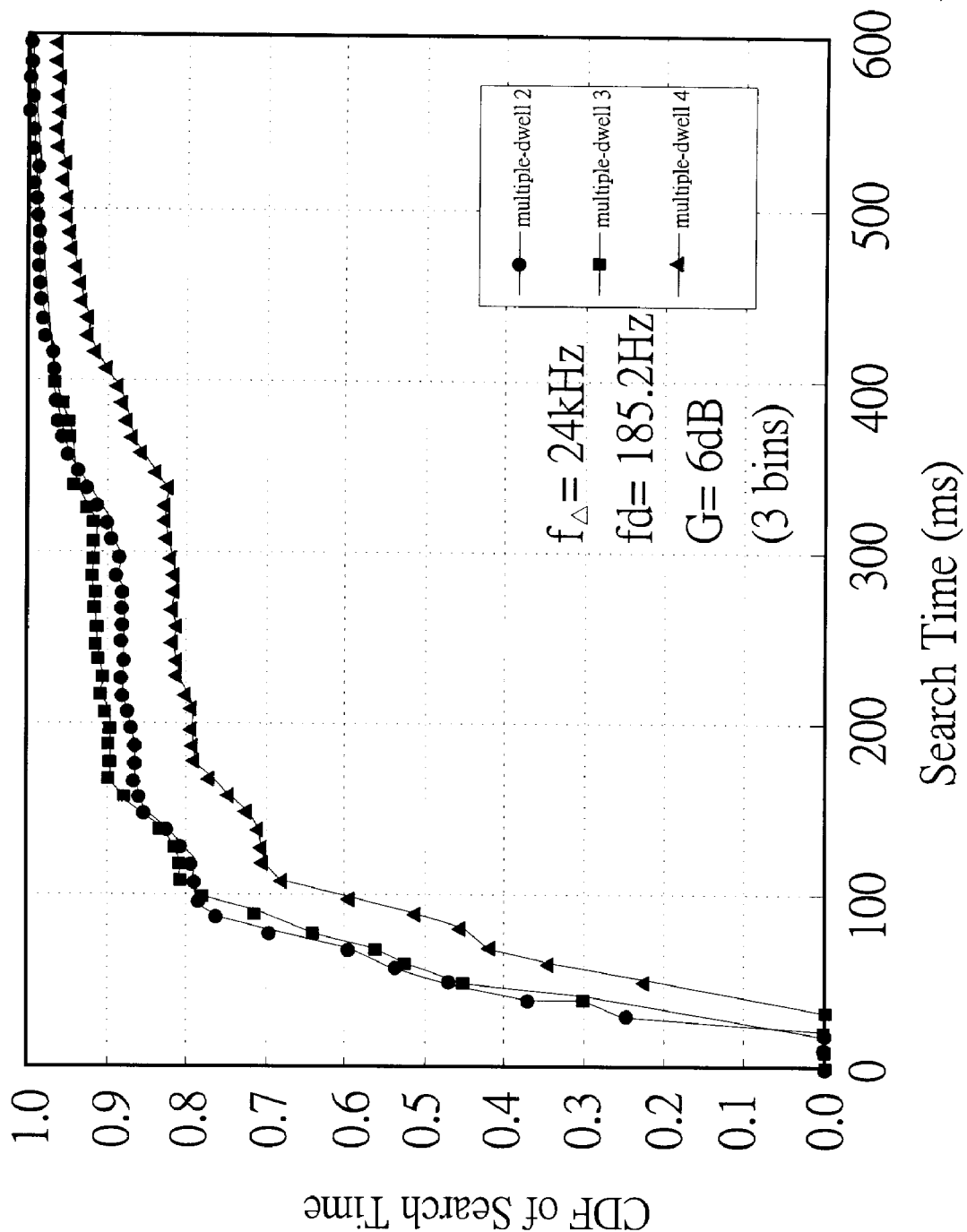
Figure 12:
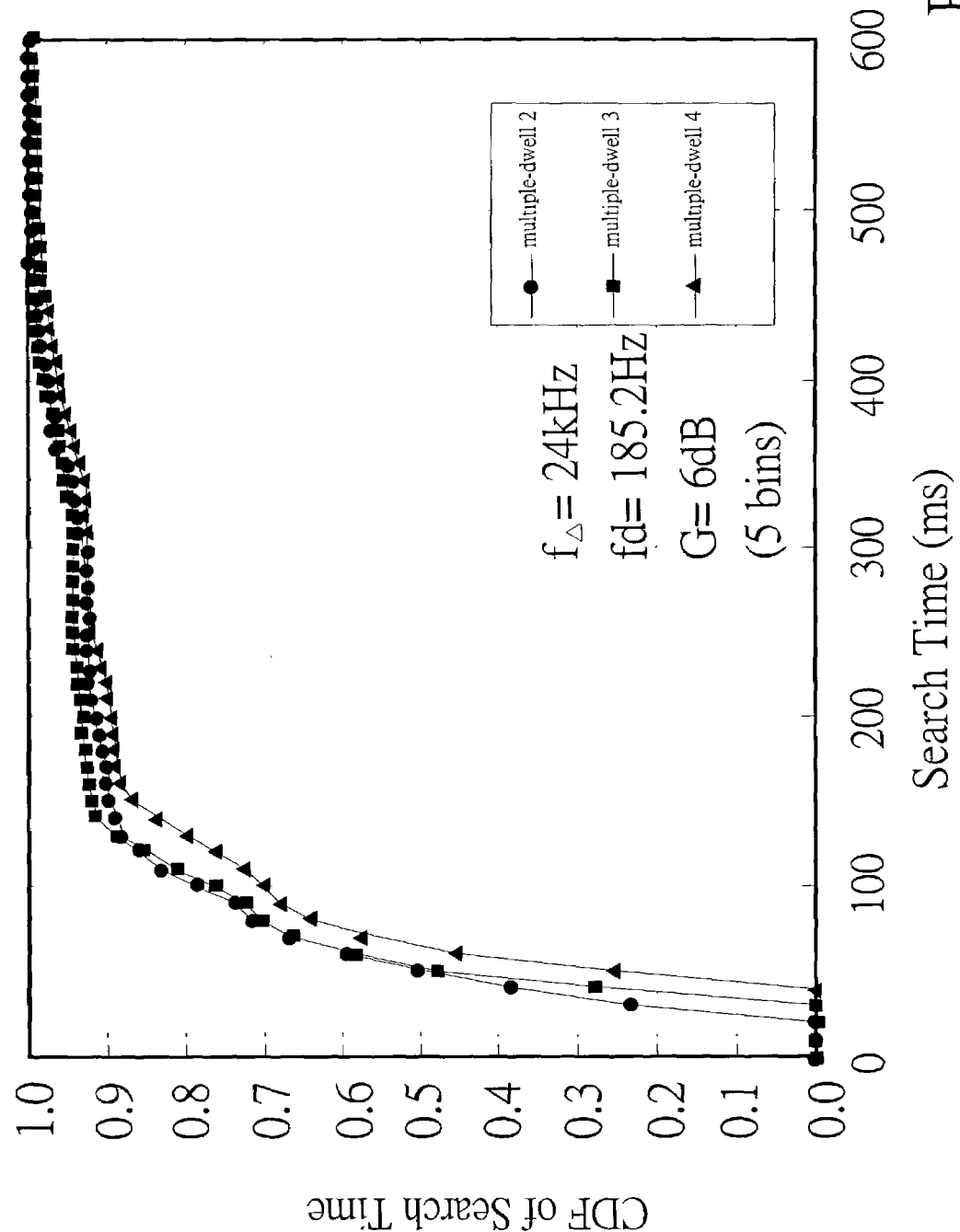

Table 1 shows clock drift generated from various condition of the frequency offset;

FIG. 4(a) and FIG. 4(b) are schematic graphs illustrating the resulting signal level and inter-chip interference under the presence of the of clock offset, caused by a frequency offset;

FIG. 5 is a diagram schematically illustrates a multiple-dwell pipeline search process in a cell search method according to the embodiment of the prevent invention;

FIG. 6 is a flowchart illustrating a cell search method implementing the multiple-dwell pipeline search according to the embodiment of the present invention;

FIG. 7(*a*) is a diagram schematically illustrates a multiple-bin method used for the embodiment of the present invention;

FIG. 7(*b*) is a diagram schematically illustrating another multiple-bin method used for the embodiment of the present invention;

FIG. 8 is a schematic diagram illustrating a signal model according to the embodiment of the present invention;

FIG. 9 is a graph comparing the performance characteristics of the cell search with various bin numbers and the effect of frequency offset $f_A$=24 kHz according to the embodiment of the present invention;

FIG. 10 is a graph comparing the performance characteristics of the cell search with various number of candidates and the effect of frequency offset $f_A$=24 kHz according to the embodiment of the present invention;

FIG. 11 is a graph comparing the performance characteristics of the cell search with the dwell time and the effect of frequency offset $f_A$=24 kHz according to the embodiment of the present invention;

FIG. 12 is a graph comparing the performance characteristics of the cell search with the dwell time and the effect of frequency offset $f_A$=24 kHz according to the embodiment of the present invention.

DETAILED DESCRIPTION OF THE EMBODIMENT

Whenever possible in the following description, like reference numerals will refer to like elements and parts unless otherwise illustrated.

Referring to FIG. 5, a diagram schematically illustrates a multiple-dwell pipeline search process in a cell search method according to the embodiment of the prevent invention. As illustrated, the scheme includes a plurality of trials, and each illustrated block represents a stage. For example, the block 511-*a* and block 511-*b* represent the first stage, the block 512 represents the second stage, and the block 513 represents the third stage respectively.

The communication system of the present invention preferably implements, but is not limited to, a total of 512 scrambling codes that are used to in downlinik within the different cells, these scrambling codes being periodically transmitted by the cell sites. In this embodiment, the scrambling codes are divided into, for example, 64 code groups, each code group having 8 codes. Furthermore, each code has a length of, for example, 38400 chips, which extends to the entire frame.

As illustrated in FIG. 5, the scheme includes three stages of each trial. In a first stage 511-*a* and 511-*b*, the slot synchronization is performed by means of a primary synchronization channel (PSCH) spread by a primary synchronization code. By using the same PSCH for each cell site, and, furthermore, by only transmitting at the slot boundaries, the slot synchronization is easily accomplished by synchronization to the PSCH. The primary synchronization code is embodied in, for example, a generalized hierarchical Golay sequence, taking advantage of easy implementation.

In a second stage 512, a secondary synchronization channel (SSCH) is used to perform the frame synchronization/code group identification after slot synchronization has been completed. The frame synchronization and code group identification are accomplished by detecting the SSCH, which is spread by one of 16 orthogonal spreading codes, also called secondary synchronization codes (SSCs). To reduce the mutual interference, the secondary synchronization codes are preferably orthogonal to the primary synchronization code. Furthermore, in order to achieve the fast frame/code group identification, the SSCH is encoded into 64 code words according to a (15,3) comma-free Reed Solomon code (CFRS) scheme, each of the code words representing a code group. Due to the favorable properties of comma free, the frame synchronization is achieved once the code group has been identified.

In a third stage 513, a common pilot channel (CPICH) is used to identify the downlink scrambling code. After the code group has been identified, in the second stage 512, the scrambling code is easily determined by selecting one of the 8 codes of the code group, by means of CPICH.

The cell search method of the present invention uses a multiple-dwell pipeline search method. As illustrated, the first stage is divided into a pre-selection stage and a deciding selection stage. In the first stage, block 511-*a* represents the pre-selection stage and block 511-*b* represents the deciding selection stage respectively. The pre-selection stage (block 511-*a*) of the first stage selects a first group of slot boundaries as a first group of candidates, and the first group of candidates is transmitted into the deciding selection stage (block 511-*b*) and the second stage (block 512) respectively. Preferred candidates are differentiated from the first group of candidates in the deciding selection stage of the first stage and, at the same time, the first group of candidates is also transmitted into the second stage (block 512) for frame synchronization and code group identification.

A second group of candidates is selected from the first group of candidates in the deciding selection stage (block 511-*b*), which are transmitted into the second stage. A third group of candidates are selected from the first group of candidates and the second group of candidates in the second stage (block 512) and in the deciding-selection stage (block 511-*b*) respectively, by decoding the (15, 3) comma-free Reed Solomon code (CFRS). Therefore, the code group identification and frame synchronization is achieved.

The process time of the pre-selection stage (block 511-*a*) in the first stage is an arbitrary time longer or equal to a slot length. The process time of the deciding selection stage (511-*b*) in the first stage is an arbitrary time longer or equal to three slot lengths. The process time of the second stage (block 512) is an arbitrary time longer or equal to three slot lengths. The process time of the deciding selection stage (block 511-*b*) in the first stage may be equal or unequal to the process time of the second stage. It is noted that the process time of the deciding selection stage (block 511-*b*) is independent from the process time of the pre-selection stage (block 511-*a*) in the first stage, and also independent from the process time of the third stage process (block 513).

Referring to FIG. 6, a flowchart schematically illustrates a cell search method implementing the multiple-dwell pipeline search according to the embodiment of the present invention. In step 600, an incoming signal from the base station is matched. In step 610, the incoming signal is over-sampled N times over the chip rate, which provides N samples denoted $Y_1(k)$, $Y_2(k)$, . . . , $Y_N(k)$ in each chip duration. In step 620, the over-sampled incoming signal is down-sampled, and the N-samples are outputted through a first stage (slot synchronization), a second stage (frame synchronization and code group identification), and a third stage (determination of a scrambling code).

In step 625, the pre-selection stage of the first stage (block 511-a), a first group of slot boundaries is selected as a first group of candidates, which are transmitted into a deciding selection stage of the first stage and the second stage respectively.

In step 630, the slot boundaries (or slot boundary) are selected by the deciding stage of the first stage or the second stage detectors according to the decision variables at the detectors output.

In step 640, the code group and frame synchronization is accomplished in the second stage. The third group of candidates is selected from the first plurality of candidates in the second stage and the second group of candidates in the deciding-selection stage (block 511-b). A coherent accumulation of the second stage may be estimated by channel of the first stage. After gathering N (N>2) secondary synchronization codes, they are correlated with the sixty-four (64) (15, 3) CFRS code words and each code word has fifteen (15) possible cyclic shift positions so as to result in 960 correlation values. Finally, the code group and cyclic shift position associated with the maximum value are identified as the desirable code group and frame boundary, respectively.

In step 650, the third stage is conducted to determine the scrambling code, which is determined from the code group identified by the CFRS code second. The third stage is actively correlated with eight (8) possible scrambling codes, wherein the code group has been identified in the second stage. An estimation, by correlation with the eight possible scrambling code, is performed every 256-chips (symbol), during which the scrambling code associated with a maximal value obtained by the estimation is recorded.

Finally, after S3 recorded (symbols) have been accomplished (i.e. the duration of the third stage), the scrambling code that has obtained the greatest number of records (i.e. maximum number of ballot) is tested a first time to determine whether the trial is successful.

In step 660, the output of the third stage, the scrambling code having obtained the greatest number of ballot is tested by comparing its maximal number of ballot with a threshold that is determined according to the constant false alarm rate for a first verification or decision. If the maximal number of ballot does not exceed the threshold value, the test has failed and a new trial without penalty is restarted. In contrast, if the maximal number of ballot exceeds the threshold value, the scrambling code undergoes a second verification.

In step 670, the scrambling code undergoes a second decision to decide whether it should be accepted. If the scrambling code fails at the second verification, another trial restarts after a processing time of $T_P$ ms.

In order to reduce effectively the performance degradation of cell search under the effect of high clock offset, and to accomplish fast cell search, a random sampling per frame scheme (RSPF) is adopted in the first stage of the step 630, the second stage of the step 640 and the third stage of the step 650. This random sampling scheme, by which one sample is randomly and independently selected among the N over-samples of the incoming signal to undergo the successive trials.

In order to reduce effectively the performance degradation of cell search under the effect of high clock offset, and to accomplish fast cell search in the present invention, a multiple-bins method is further adopted in the first stage (slot synchronization) of the step 630, the second stage (frame synchronization and code group identification) of the step 640 and the third stage (identification of the scrambling code) of the step 650 if necessary. The multiple-bins method further comprises the following steps of: dividing an uncertain range of carrier frequency of the incoming signal into a plurality of cells, each cell having a sub-carrier frequency, wherein the plurality of the sub-carrier frequencies are reference frequencies for processing the incoming signal in each step.

Figure 7A:
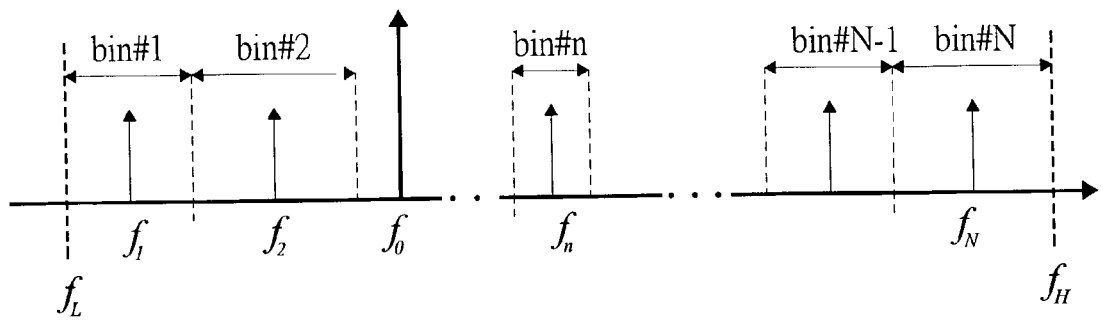

Referring to FIG. 7(a), a diagram schematically illustrates a multiple-bin method used for the embodiment of the present invention. The horizontal axis is a plot of frequency. The carrier frequency of the incoming signal is $f_0$. Due to the crystal oscillator's precision of the user equipment, there is a difference between the carrier frequency of the incoming signal and the frequency of the crystal oscillator, and the margin of difference is between $f_H$ and $f_L$. Namely, from the view of the user, the carrier frequency of the incoming signal is between the range of the $f_H$ and $f_L$, wherein the range is called the uncertain range of the carrier frequency. According to the multiple-bin method of the present invention, the uncertain range of the carrier frequency is divided into a plurality of cells, each cell has a sub-carrier frequency, wherein the plurality of the sub-carrier frequencies are reference frequencies for the process of the incoming signal in the first stage (slot synchronization) in step 630, a second stage (frame synchronization and code group identification) in step 640 and a third stage (determination of a scrambling code) in step 650. The plurality of cells is called bins. The uncertain range of carrier frequency of the incoming signal is divided into equal or unequal parts of the cells. As illustrated in FIG. 7(a), the uncertain range of carrier frequency of the incoming signal is divided into unequal parts of the cells, and the sub-carrier frequency is in the middle point of the plurality of cells.

However, the uncertain range of carrier frequency of the incoming signal is, preferably, divided into equal parts of the cells.

Figure 7B:
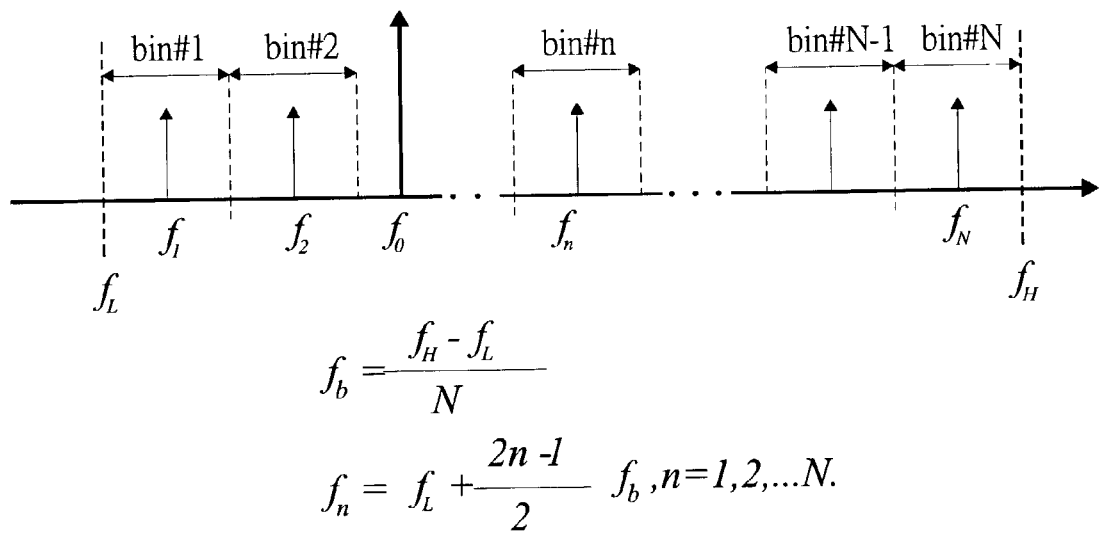

Referring to the FIG. 7(b), a diagram schematically illustrates another multiple-bin method used for the embodiment of the present invention. The uncertain range of carrier frequency of the incoming signal is divided into equal parts of the cells, and the sub-carrier frequency is in the middle point of the plurality of cells. The uncertain range of carrier frequency of the incoming signal is assumed to be divided into N bins, and the nth sub-carrier frequency is expressed as $f_n$, wherein n is greater than or equal to 1 and smaller than or equal to N, and the nth sub-carrier frequency is expressed as $f_n$ as shown in FIG. 7(b). The advantage of implementing the multiple bins in the embodiment of the present invention is the uncertain range of carrier frequency of the incoming signal is divided into a plurality of the sub-carrier frequencies. So the sub-carrier frequencies are close to the incoming signal's carrier frequency. Then, the difference between the carrier frequency of the incoming signal and the sub-carrier frequency, used for the reference frequency in each stage of the cell search, is reduced. The performance of the cell search by using the multiple-bin method under the frequency offset therefore improves. This multiple-bin method can be used in any stage of the trials.

A computer simulation is conducted for comparing the cell search performance of this invention and prior art. The results of the simulation are obtained for N=2. Note that, N is the number of the over-samples in a chip time. The maximum Doppler shift is equal to 185.2 Hz (equivalent to a user equipment moving at a speed of 100 km/hr.) Each stage takes 10 (ms), $T_P$=250 (ms) and $\eta_0$ is set with a false alarm rate of $10^{-4}$. In addition, the transmitting powers of the physical channels are distributed as follows. The PSCH and the SSCH have the same power. The power ratio of the CPICH to the synchronization channels (i.e. PSCH+SSCH)

is constant. Furthermore, the power of CPICH is approximately 10% of the total transmission power. In other words, during cell searching, 80% of the transmission power of the base station contributes to the intra-cell interference. Finally, a geometry factor $G=(P_I+Ppsc+Pssc+Ppc)/Px$ is used to modularize the location of user equipment in the cell. The greater G value, the closer to the base station is the mobile station. The cumulative density function (CDF) of the cell search time is used to evaluate the performance index of the cell search methods.

Referring to FIG. 8 is a schematic diagram illustrating a signal model according to the embodiment of the present invention. The received signal r (t) uses a base band representation and is defined as:

$$r(t) = \sum_{i=-\infty}^{\infty} \{[\sqrt{P_{psc}}\, c_{psc}(i) + \sqrt{P_{ssc}}\, c_{ssc}(i) + \sqrt{P_{pc}}\, c_{pc}(i)]h(t - i(1+\xi)\tilde{T}_c - \tau) + \sqrt{P_I}\, n_I(t)\}g(t)e^{j2\pi f_\Delta t} + \sqrt{P_X}\, n_X(t)$$

wherein $P_{psc}$, $C_{psc}$, $P_{ssc}$, $C_{ssc}$ and $P_{pc}$, $C_{pc}$ are the power and spreading codes of the PSCH, SSCH and CPICH, respectively, g (t) is a complex-valued Rayleigh fading gain, h (t) is a square root raised cosine shaping function having a roll-off factor 0.22, $\tilde{T}_c$ is the chip duration of the user equipment (UE). τ is the initial random delay and modeled by a random variable that has a uniform distribution over the interval (−0.5 Tc, 0.5 Tc), $T_c$ being defined as the chip duration of the base station, and $f_c$ is the carrier wave frequency of the base station. $f_\Delta$ is the frequency offset between the user equipment and the base station, and $\xi = f_\Delta/f_c$. Furthermore, $P_I$ and $P_x$ are the respective powers of the intra-cell interference $n_I$ (t) and inter-cell interference $n_x$ (t), wherein $n_I(t)$ and $n_x(t)$ are modeled as zero mean additive white Gaussian noise with unity variance. Some considerations should be particularly noticed from the above model. First, only a flat fading channel is considered, and only the channels involved in the cell search are considered in the representation of the received signal. Any other channels are incorporated in either in the interference terms $n_I(t)$ or $n_x(t)$. Furthermore, ξ represents the clock offset effect, and τ represents the non-ideal sampling effects. All these factors are omitted in the model of the prior art. In addition, the frequency offsets and the non-ideal sampling in the model used in the present invention come from the uncertainty of the propagation delay, and the phase offset and sampled frequency offset, caused by the clock offset.

FIG. 9 is a graph comparing the performance characteristics of the cell search with various bin numbers and the effect of frequency offset $f_A$=24 kHz. The performance of the cell search proceeds under the condition of multiple bins used in the first stage. When the bin number is 1, the cumulating-density-function (CDF) of search time, the index for expressing the performance of cell search, obviously deteriorates. When the bin number increases to 3, the CDF of the search time is raised. However, when the bin number increases to be 4, the CDF of the search time is not significantly better. Therefore, increasing the bin numbers does not improve the performance of the CDF. Which means the bin numbers should be reduced to a number to take the lowest complexity with fair performance for a correct cell search.

FIG. 10 is a graph comparing the performance characteristics of the cell search with various number of candidates and the effect of frequency offset $f_A$=24 kHz according to the embodiment of the present invention. For simplicity, the process time of the deciding selection stage in the first stage is equal to that of the second stage. If the process time of the deciding selection stage is X times longer than the process time of the pre-selection stage, the dwell time is expressed as X+1. The first stage illustrated in FIG. 10 adopts the condition of 3 bins and 2 dwell-time. The first stage selects a plurality of slot boundaries as a plurality of candidates from the primary synchronization code and transmits the plurality of candidates into the second stage. Ten candidates transmitted to the second stage perform better.

FIG. 11 is a graph comparing the performance characteristics of the cell search with the dwell time and the effect of frequency offset $f_A$=24 kHz according to the embodiment of the present invention. The random sampling per frame scheme is used in the first stage, the second stage, and the third stage. The random sampling per frame adopts the condition of 3 bins and 10 candidates in the first stage. As illustrated in FIG. 11, under the condition of 3 bins in the first stage and the second stage, four times of dwell time is not suitable.

FIG. 12 is a graph comparing the performance characteristics of the cell search with the dwell time and the effect of frequency offset $f_A$=24 kHz according to the embodiment of the present invention. The random sampling per frame scheme is used in the first stage, the second stage, and the third stage. Unlike the condition illustrated in FIG. 11, the first stage adopts the condition of 5 bins and 10 candidates. As illustrated in FIG. 12, the conditions of 5 bins and 3 times of dwell time have better performance in reducing the effect of high clock offset in the system. Which means the bin numbers should be reduced to a number to take the lowest performance for a correct cell search.

Therefore, the cell search method for the present invention, implemented in a CDMA system substantially reduces the effects caused by non-ideal sampling and clock offset.

It should be appreciated that the method according to the present invention is applicable to the mobile equipment or wireless Personal Digital Assistant (PDA) system.

Those skilled in the art will readily appreciate that the above description is only illustrative of specific embodiments and examples of the present invention. The present invention should therefore cover modifications and variations made to the herein-described structures and operations, provided they fall within the scope of the present invention as defined in the following appended claims.

TABLE 1

TABLE I:Clock Shift with Different Frequency Offset in a 30 ms Trial

| Frequency | Clock Shift with Time ($\tilde{T}c$) | | |
|---|---|---|---|
| Offset (kHz) | 10 ms | 20 ms | 30 ms |
| 0 | 0 | 0 | 0 |
| 6 | 0.1152 | 0.2304 | 0.3456 |
| 8 | 0.1536 | 0.3072 | 0.4608 |
| 12 | 0.2304 | 0.4608 | 0.6912 |
| 24 | 0.4608 | 0.9216 | 1.3824 |

What is claimed is:

1. A cell search method for use in a wideband code division multiple access (W-CDMA) system, the cell search method comprising:

matching an incoming signal having an uncertain range of carrier frequency from a base station;

over-sampling the incoming signal, thereby obtaining an over-sampled incoming signal;

down-sampling the over-sampled incoming signal into a down-sampled incoming signal having a plurality of slot boundaries; and applying a trial to the down-sampled incoming signal, wherein the trial comprising:

slot synchronizing the down-sampled incoming signal as a first stage;

frame synchronizing and code group identifying the down-sampled incoming signal as a second stage;

identifying a scrambling code of the down-sampled incoming signal as a third stage, wherein the first stage, the second stage, and the third stage are each further comprised of dividing the uncertain range of carrier frequency into a plurality of cells such that each of the plurality of cells has a sub-carrier frequency;

testing the scrambling code against a threshold $\eta_0$ as a first verification; and testing the scrambling code of the first verification that has exceeded the threshold $\eta_0$ as a second verification.

2. A cell search method as claimed in claim 1, wherein the first stage comprising:

pre-selecting a first group of slot boundaries as a first group of candidates; and selecting a second group of candidates from the first group of candidates.

3. A cell search method as claimed in claim 2, wherein the second stage comprises selecting a third group of candidates from the first group of candidates.

4. A cell search method as claimed in claim 1, wherein the trial restarts without a penalty time when the scrambling code is not exceeded the threshold $\eta_0$, the trial restarts with a penalty time when the scrambling code of the first verification is not exceeded the threshold $\eta_0$.

5. A cell search method as claimed in claim 1, further comprising using a generalized hierarchical Golay sequence as a primary synchronization code (PSC) in a primary synchronization channel (PSCH).

6. A cell search method as claimed in claim 1, further comprising using 16 secondary synchronization codes (SSCs) orthogonal to the PSC in a secondary synchronization channel (SSCH).

7. A cell search method as claimed in claim 3, wherein the third group of candidates is carried out a decoding process by using a (15,3) comma-free Reed Solomon code (CFRS).

8. A cell search method as claimed in claim 1, wherein the frame synchronizing and code group identifying in the second stage uses a code group and cyclic shift position associated with a maximum value respectively.

9. A cell search method as claimed in claim 1, wherein the identifying a scrambling code in the third stage is determined by selecting one of the 8 codes in a common pilot channel (OPICH).

10. A cell search method as claimed in claim 1, wherein the threshold $\eta_0$ is chosen according to a constant false alarm rate.

11. A cell search method as claimed in claim 1, wherein the first stage, the second stage, and the third stage comprise choosing one of the down-sampled incoming signals randomly.

12. A cell search method as claimed in claim 1, wherein the uncertain range of carrier frequency is between the maximum and minimum frequency of the incoming signal.

13. A cell search method as claimed in claim 1, wherein the uncertain range of carrier frequency is divided into a plurality of small cells (also called bins) with equal size or unequal size.

14. A multi-dwell pipeline cell search method for use in a wideband code division multiple access (W-CDMA) system, the multiple-dwell pipeline cell search method comprising:

slot synchronizing a down-sampled incoming signal having an uncertain range of carrier frequency as a first stage;

frame synchronizing and code group identifying the down-sampled incoming signal as a second stage;

identifying a scrambling code of the down-sampled incoming signal as a third stage, wherein the first stage, the second stage, and the third stage are each further comprised of dividing the uncertain range of carrier frequency into a plurality of cells such that each of the plurality of cells have a sub-carrier frequency;

testing the scrambling code against a threshold $\eta_0$ as a first verification, wherein when the threshold $\eta_0$ is not exceeded, restarts the trial without a penalty time; and testing the scrambling code of the first verification that has exceeded the threshold $\eta_0$ a second verification, wherein when the scrambling code of the second verification is not exceeded the threshold $\eta_0$, the trial restarts with a penalty time.

15. A multi-dwell pipeline cell search method as claimed in claim 14, wherein the first stage comprises:

pre-selecting a first group of slot boundaries as a first group of candidates; and selecting a second group of candidates from the first group of candidates.

16. A multiple-dwell pipeline cell search method as claimed in claim 14, wherein the second stage comprises selecting a third group of candidates from the first group of candidates.

17. A multi-dwell pipeline cell search method as claimed in claim 14, wherein the threshold $\eta_0$ is a constant false alarm rate.

18. A multi-dwell pipeline cell search method as claimed in claim 14, wherein the first stage, the second stage, and the third stage comprise choosing one of the down-sampled incoming signals randomly.

* * * * *